United States Patent
Pichon et al.

(10) Patent No.: US 12,540,859 B2
(45) Date of Patent: Feb. 3, 2026

(54) METHOD FOR MEASURING BY THERMOGRAPHY A HEATING SURFACE, IN PARTICULAR AN ELECTRIC HEATING PLATE

(71) Applicant: THERMOCOAX, Caligny (FR)

(72) Inventors: Laurent Pichon, Caligny (FR); Denis Lecharpentier, Caligny (FR)

(73) Assignee: THERMOCOAX, Caligny (FR)

( * ) Notice: Subject to any disclaimer, the term of this patent is extended or adjusted under 35 U.S.C. 154(b) by 437 days.

(21) Appl. No.: 18/170,168

(22) Filed: Feb. 16, 2023

(65) Prior Publication Data
US 2024/0175758 A1    May 30, 2024

(30) Foreign Application Priority Data
Nov. 29, 2022    (FR) ...................................... 2212515

(51) Int. Cl.
*G01J 5/48* (2022.01)
*G01N 25/72* (2006.01)
*G01J 5/00* (2022.01)

(52) U.S. Cl.
CPC ......... *G01J 5/48* (2013.01); *G01J 2005/0077* (2013.01); *G01N 25/72* (2013.01)

(58) Field of Classification Search
CPC .... G01J 5/48; G01J 2005/0077; G01J 5/0879; G01N 25/72
See application file for complete search history.

(56) References Cited

U.S. PATENT DOCUMENTS

| | | | |
|---|---|---|---|
| 11,009,408 B2* | 5/2021 | Comas | G01J 5/0037 |
| 11,353,364 B2* | 6/2022 | Thompson | H04N 23/23 |
| 2009/0129431 A1 | 5/2009 | Safai et al. | |
| 2013/0208760 A1 | 8/2013 | Sibilant et al. | |
| 2021/0201472 A1* | 7/2021 | Sohn | G06V 10/764 |
| 2021/0285822 A1* | 9/2021 | Carcasi | G01J 5/0007 |
| 2021/0362429 A1* | 11/2021 | Barnes | B33Y 10/00 |

FOREIGN PATENT DOCUMENTS

| | | |
|---|---|---|
| CN | 106781430 B | 11/2020 |
| JP | 2003226826 A | 8/2003 |
| JP | 2015128093 A | 7/2015 |

OTHER PUBLICATIONS

Computer translation of JP 2003-226826 downloaded from the JPO website on Jun. 25, 2025.*
Omputer translation of JP 2015-128093 downloaded from the JPO website on Jun. 25, 2025.*
French Search Report and Opinion received for Application No. 2212515, dated May 30, 2023.

* cited by examiner

*Primary Examiner* — Randy W Gibson
(74) *Attorney, Agent, or Firm* — Greer, Burns & Crain, Ltd

(57) ABSTRACT

A method for measuring by thermography a heating surface such as a metal surface, a ceramic surface in particular an electric heating plate includes a homogeneous layer with constant thickness of a coating material is deposited onto the surface to be measured, the surface is heated to a determined temperature; and a thermal image of the surface coated with the layer of coating material, heated, is captured using a thermal measurement apparatus, the coating material having an emissivity detectable at the determined temperature in the spectral range of the thermal measurement apparatus, the coating material having an emissivity higher than that of the surface in the spectral range of the thermal measurement apparatus.

14 Claims, 1 Drawing Sheet

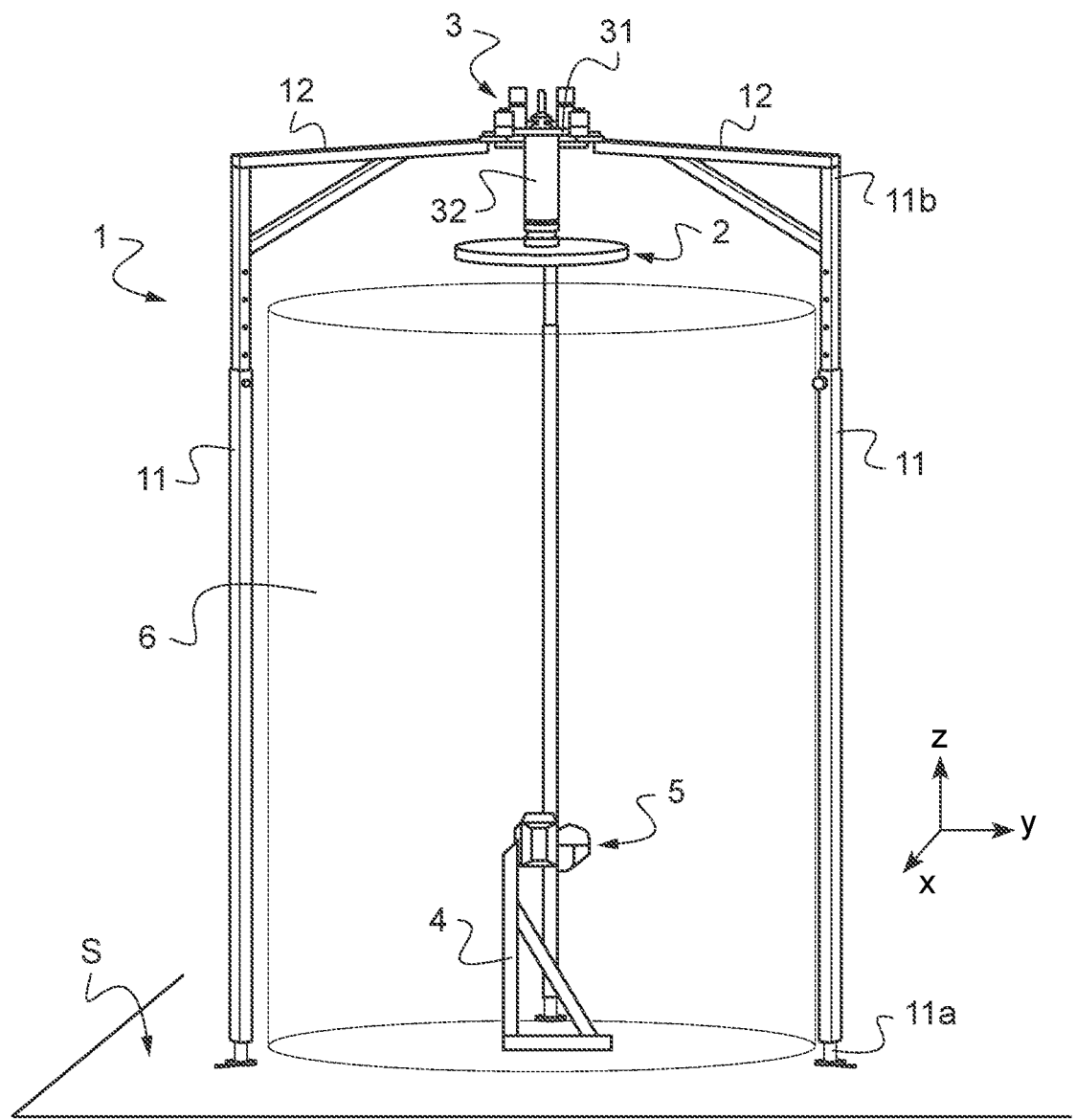

METHOD FOR MEASURING BY THERMOGRAPHY A HEATING SURFACE, IN PARTICULAR AN ELECTRIC HEATING PLATE

BACKGROUND

The object of the present invention is a method for measuring by thermography a surface such as a heating surface, in particular an electric heating plate, as well as a facility for implementing said method.

Heated metal surfaces such as electric heating plates are especially used by the equipment manufacturers of deposition machines for the semiconductor industry. These plates are used to warm up silicon wafers, onto which the substrate required for etching electronic chips is deposited.

This equipment is highly technical and should therefore be very precisely thermally characterised. Therefore, the criterion of thermal homogeneity on the surface of heated wafers is crucial for the quality of deposition of this substrate. It is therefore important to provide a heating plate with a thermal homogeneity allowing homogeneous heating of said wafers.

Also, during the manufacture of these heating plates, checking of thermal homogeneity of the surface of the heating plates should be implemented, which allows both an accurate and repeatable measurement.

Various methods are known for measuring thermal homogeneity of a heated metal surface. These include contact measurement methods using thermocouples or Resistance Temperature Detectors (RTDs) and remote measurement methods using infrared cameras or pyrometers, that is without contact.

Contact measurement methods are implemented using thermocouples or resistance temperature detectors in contact with the surface to be checked, which is relatively intrusive and can especially modify the temperature of the plate locally, thus affecting accuracy of the measurement. Variable contact resistances depending on the location of the measurement and the pressure exerted on the sensor can further affect repeatability of the measurements. In addition, to obtain a correct reading, it is necessary to wait until the object reaches a temperature at the contact point, which phenomenon "pumps" heat from the object and can therefore change the temperature of the measurement point. As a result, there are risks of measurement drift over time, in particular when using thermocouples.

Non-contact measurement methods offer the advantage of a non-intrusive method. As a result, the measurement process has no influence on the surface temperature of the plate under test.

Thermal cameras or pyrometers are used for non-contact temperature measurements in industrial applications. Pyrometers and thermal imaging cameras work on the same principle: they detect infrared radiation and convert it into a temperature measurement. However, thermal imaging cameras have several advantages over pyrometers. Indeed, a pyrometer only indicates a value, whereas thermal cameras produce a complete image.

Thus, if a pyrometer measurement method is used, the temperature of a single point is measured and mapping of the plate requires a large number of successive measurements over a period of time during which the plate should remain stable in temperature, which can turn out to be difficult to implement.

Thermography with an infrared camera allows the establishment of the complete temperature field of a metal surface to be checked in a single measurement without contact.

However, a problem arises when carrying out a remote measurement of this type, insofar as metal surfaces have a low emissivity at wavelengths to which the usual infrared sensors are sensitive, that is between 0.76 µm and 1000 µm, which is unfavourable for the accuracy of the measurement.

SUMMARY

In order to overcome the drawbacks mentioned, one object of the invention is a method for measuring by thermography a heating surface such as a metal surface, a ceramic surface, in particular an electric heating plate, the invention comprising in that:
- a homogeneous layer of constant thickness of a coating material is deposited onto the surface
- the surface is heated to a given temperature; and
- a thermal image of said heated surface coated with said layer of coating material by means of a thermal measurement apparatus is captured,
- the coating material having a detectable emissivity in the spectral range of the thermal measurement apparatus.

Advantageously, by depositing onto the surface such as a heating metal surface to be tested a material with a detectable emissivity, preferably higher than that of the metal surface for a given temperature, in the spectral range of the infrared thermal measurement apparatus used, preferably an infrared thermal camera, then a thermal image can be recovered in a simple and reliable manner. This emissivity is preferably high and for example greater than 70% in the wavelength range of standard infrared cameras, that is from 7.5 to 14 µm.

Advantageously, the heating temperature determined is chosen in a temperature range corresponding to the operating temperatures of the heating surface. In the case where the heating surface is metallic and constitutes an electric heating plate, the temperature is chosen in the range from 350 to 450° C., preferably 400° C., the operating temperature of said surface.

In particular, the emissivity of the coating material is higher than that of a metal surface, thus enabling measurement without the risk of divergent, unstable and unreliable measurements due to the low emissivity of metals in the spectral range of a thermal infrared camera.

The non-contact measurement method according to the invention makes it possible to carry out a surface temperature measurement instantaneously, which can be achieved in some milliseconds, and without mechanical action (by contact of a sensor) on the surface to be measured.

The invention provides a method for measuring the heated metal surface by thermography which is simple to implement and furthermore makes it possible to limit measurement errors on the surface of a heated metal plate, for example between 350 and 450° C.

Indeed, the method proposes depositing a smooth and homogeneous coating layer, which makes it possible to obtain the most homogeneous surface condition possible. This surface condition allows for a uniform, reliable and repeatable measurement. It is indeed possible for the metal surface to show spots, roughnesses in places, traces of machining or oxidation (welds, previous heating) and for the infrared thermal camera to interpret these as different temperature zones. This is particularly problematic when the thermal homogeneity of a heating plate is desired to be evaluated, as each zone of the plate may have a different emissivity due to varying surface conditions. The presence of a coating material in the form of a smooth, homogeneous layer therefore advantageously masks such surface defects and makes the measurements repeatable, avoiding variations in emissivity and therefore in the temperatures read by the thermal measurement apparatus.

The method of the invention is advantageously applicable to ceramic heating surfaces as well. Indeed, the method can also be applied to any surface of a material whose emissivity is sufficient to be measured by thermography, but whose measurement may be disturbed due to the surface condition. Thus, if the ceramic surface has variations in surface condition (stains, scratches, etc.) which result in variations in emissivity and therefore in temperatures read by the thermal measurement apparatus, the deposition of a material such as kaolin will make the surface condition and therefore the emissivity, which will be the same at all points, uniform, thus avoiding a variation in the temperatures read. The invention thus advantageously makes it possible to promote uniformity of the emissivity of the surface to be measured.

According to the invention, the coating material is an inert, non-toxic material which, furthermore, is easily removable from the metal surface after measurement, while providing a high emissivity sufficient to perform the measurement in a spectral range of 7.5 to 14 μm of a standard thermal infrared camera.

According to a preferred form of the invention, such a material consists of a white clay such as kaolin consisting of an aluminosilicate, for example based on kaolinite of the formula $Al_2Si_2O_5 (OH)_4$; or even based on $Al_2SiO_7 \cdot 2H_2O$ of the density 470 kg/m$^3$, provided under the commercial name "Kaolin Blanc" by the Merck company.

This white clay is mixed with water, preferably in the following proportions: 40% white clay and 60% water. This mixture is then deposited, sprayed onto the heating plate to be tested to form a homogeneous coating, with constant thickness, and a smooth and opaque surface. The layer is deposited to be homogeneous and opaque, and preferably has a constant thickness of between 50 μm and 100 μm.

Such a material is particularly advantageous because the white clay layer has a high emissivity, 0.96 at a temperature of 400° C., between 5 and 14 μm, much higher than that of the bare metal surface, which allows the use of standard type infrared cameras having a spectral range of 7.5 to 14 μm, for example.

Advantageously, as the white clay is water soluble, the mixture is deposited in the following proportions: 40% kaolin and 60% water by volume, by manual spraying onto the metal surface, for example with a manual paint gun.

Preferably, the same mixture can be deposited, such as sprayed, onto the heating metal surface using an automatic deposition device such as a robot with XY movement and regulated pressure.

In addition, it is easily removable by washing with water without risk of damage to the metal surface. It is important that no residue of the coating material remains on the surface once the measurement is done.

Once the mixture has been deposited onto the surface, the surface is dried, either in the open air or in an oven at 150° C.

A homogeneous coating, of constant thickness and with a high emissivity in the spectral range of a thermal measurement apparatus such as a standard infrared thermal camera, therefore advantageously makes it possible to compensate for the uncertainties related to imperfections of the metal surface to be checked, in particular for metals with low to medium emissivity.

Another object of the invention is a facility for implementing the method for measuring by thermography a heating surface such a metal surface, such a ceramic surface, in particular an electric heating plate, according to the invention, characterised in that it comprises:
- a station for depositing a homogeneous layer with constant thickness of a coating material onto the surface;
- a station for remotely thermally measuring said surface coated and heated, using a thermal measurement apparatus.

The deposition station is a station for depositing by spraying the white clay and water mixture consisting of either a manual application device such as a paint gun or an automatic deposition device such as a robot with XY movement and regulated pressure.

The deposition station also includes a drying station, either in the open air or equipped with a drying apparatus, such as an oven.

The thermographic measurement station consists of a chassis including means for suspending the coated surface to allow positioning of said surface in the upper part of the chassis, means for heating the surface and means for supporting a thermal measurement apparatus, the suspension means being arranged so that the heated coated metal surface is suspended with said surface directed towards the lower part of the chassis, that is towards the ground on which the chassis is erected, the support means being arranged so that the thermal measurement apparatus is directed towards the heated coated surface suspended. In this way, an infrared thermal camera is placed on the ground using the support means, while the coated and heated surface is suspended above said infrared thermal camera, which advantageously makes it possible to limit the convection effects on the heated metal surface and therefore turbulence that could disturb the measurement.

In order to make the measurement even more reliable, the measurement station also includes a protective screen surrounding the measurement zone between the coated metal surface and the infrared thermal camera in order to attenuate parasitic effects of the environment. Indeed, the humidity in the air can absorb some of the radiation, lighting or other sources in the vicinity can interfere with the infrared camera or even the ventilation within the station. The protective screen makes it possible to control these parameters, which contributes to obtaining a reliable, non-intrusive and repeatable remote thermal measurement by the infrared camera.

BRIEF DESCRIPTION OF THE DRAWING

The invention will now be described in more detail with reference to the drawing which represents:

FIG. 1 shows a side perspective view of a measurement station of a facility for implementing the method according to the invention.

DETAILED DESCRIPTION

In order to make a metal heating plate, a metal slice such as steel, nickel-based alloys, is machined. The machining process forms a metal surface on the back of which an electric heating cable is housed.

Because of their use in the field of electronics, these plates should be very precisely thermally characterised. In particular, the criterion of thermal homogeneity at the surface is crucial.

Also, during the manufacture of these heating plates, it is important to be able to check this criterion of thermal homogeneity by means of a measurement of the surface temperature which should be accurate and repeatable, making it possible in particular to limit measurement errors at the surface of a plate heated to 400° C., which temperature corresponds to the temperature in use.

To this end, a non-contact temperature measurement of the surface of the heating plate is carried out using an infrared thermal camera, thus making it possible to obtain a remote, non-contact image of the entire surface of the heating plate.

In order to carry out a reliable and repeatable measurement from one plate to another, the method according to the invention proposes, in a facility according to the invention, depositing a layer of inert coating material such as a white clay, preferably kaolin, onto the surface of the heating plate to form a homogeneous coating, with a smooth surface and constant thickness, on said metal surface.

Such a coating provides a homogeneous surface condition which allows reliable and repeatable measurement using an infrared camera.

Any spots or roughnesses that may be present in places on the metal surface are masked by the layer of material deposited, which prevents the infrared camera from interpreting them as zones with different temperatures. The coating layer therefore makes it possible to carry out a measurement that allows evaluation of the thermal homogeneity without the risk that one place of the plate may have a different emissivity due to variations in the surface conditions, which would thus give "erroneous" results with regard to the actual homogeneity criterion.

The coating material chosen is a white clay, such as kaolin, comprising an aluminosilicate ($Al_2SiO_{7}·2H_2O$ with a density of 470 kg/m$^3$). The emissivity of the white clay or kaolin is very high in the spectral range between 5 and 14 µm, corresponding to that of the standard type infrared thermal camera used. This layer of coating material allows the use of an infrared camera of standard spectral range (that is for long wavelengths and a temperature of 400° C.).

Since white clay or kaolin is readily soluble in water, a mixture is prepared in the following proportions: 40% kaolin and 60% water by volume. This mixture is then easily sprayed onto the heating plate in order to make the coating layer having a smooth, opaque and homogeneous surface.

This mixture is deposited in a coating station, either with a manual paint gun, in a regular way with criss-crossing passes, at about 40 cm from the surface to be treated.

Alternatively, and preferably, the deposition station comprises an automatic deposition device such as a robot with XY movement and regulated pressure, which cross hatches the heating plate at a distance of 30 to 50 cm in order to obtain a constant thickness repeatedly.

Preferably, the thickness of the kaolin deposited is in the range of 50 µm to 100 µm. A thickness chosen in this range is optimal to avoid any risk of flaking while being sufficiently opaque. Once the mixture is deposited, the heating plate coated is dried, preferably in an oven at 150° C. In this way, the white clay dissolved in water is deposited in a thin layer in a relatively easy to check manner, masking the surface condition of the plate, which is in a way reset to zero.

Once the deposit has dried, the coating is sufficiently adherent to allow the treated heating plate to be handled without the risk of the coating layer peeling off. The coating layer deposited thus obtained offers an emissivity of 0.96 at 400° C.

This value is determined beforehand by comparison with a 0.5 mm diameter, stainless steel-sheathed K-type thermocouple measuring the surface temperature of the plate at a specific place. The thermal camera used measures the same location in parallel, the emissivity entered into the camera is then modified until the camera and thermocouple indicate the same value. This double measurement is carried out many times at different locations on the plate. The deposit (coating) is stable up to 600° C., so it is possible to perform thermal homogeneity tests on any support up to this temperature level.

Thus, the infrared thermal camera is reliably adjusted to engage a check measurement chain, enabling reliable thermal homogeneity check measurements of heating plates.

The kaolin-coated heating plate is placed in a thermal measurement station. This station comprises a chassis 1 made up of three vertical posts 11 which rest through a lower part or foot 11a on a support surface, such as the ground S of a measurement room. The upper end 11b of the post 11 carries a crosspiece 12, the three crosspieces 12 at their junction having means for suspending 3 the heating plate 2 and means for heating the plate, such as electrical connection means for heating the plate 2.

These suspension means are especially made up of a base 31 attached to the crosspieces 12 and a shank 32 on which the electric heating plate 2 is attached with its kaolin-coated surface directed towards the ground.

Support means 4 for the infrared thermal camera 5 are positioned on the ground, with the lens of the infrared thermal camera 5 pointing to the coated surface suspended above. Holding the heating plate 2 by the suspension means 3 of the chassis 1 with its heating surface directed towards the ground and above the infrared thermal camera 5 positioned in proximity to the ground and directed towards said heated metal surface, makes it possible to limit turbulence related to the convection effects at the surface of the plate 2.

A peripheral protective screen 6 surrounds the measurement zone and thus attenuates parasitic effects of the environment.

Once the temperature of the plate 2 has stabilised, it is possible to make infrared thermography with a repeatability of ±1° C. at 400° C. This makes it possible to provide a reliable performance test at the end of the manufacturing process and ensures that there is no drift in production. At the end of the test, the white clay can be easily removed by washing with water, for example with a demineralised water jet.

While a particular embodiment of the present method for measuring by thermography a heating surface, in particular an electric heating plate, have been described herein, it will be appreciated by those skilled in the art that changes and modifications may be made thereto without departing from the invention in its broader aspects and as set forth in the following claims.

The invention claimed is:
1. A method for measuring by thermography a heating surface intended to warm up silicon wafers for checking of thermal homogeneity of said heating surface, said method comprising:
a homogeneous layer with constant thickness of a coating material is deposited onto the heating surface to be measured to improve a detectable emissivity of the surface and to promote uniformity of the emissivity of the surface;
the surface is heated to a determined temperature;
a thermal image of said surface coated with said layer of coating material, heated, is captured by means of a thermal measurement apparatus;

the coating material having the emissivity detectable at the determined temperature within the spectral range of the thermal measurement apparatus; and the coating material is removed from the heating surface after thermal measurement.

2. The method according to claim 1, characterised in that the emissivity of the material is higher than that of the heating surface at the temperature determined, in the spectral range of the thermal measurement apparatus.

3. The method according to claim 1, characterised in that the heating surface is an electric heating plate, heated to a determined temperature in the range from 350 to 450° C.

4. The method according to claim 1, characterised in that the coating material is kaolin consisting of an aluminosilicate, $Al_2SiO_7 \cdot 2H_2O$ with a density of 470 kg/m$^3$.

5. The method according to claim 4, characterised in that the white clay is mixed with water in the following proportions of 40% white clay and 60% water, and then the mixture is deposited to form a layer with a constant thickness of between 50 µm and 100 µm.

6. The method according to claim 5, characterised in that the mixture is deposited by spraying onto the surface either by means of a manual deposition device, or by means of an automatic deposition device.

7. The method according to claim 5, characterised in that once the mixture has been deposited onto the surface, the latter is dried either in the open air or in an oven at 150° C.

8. The method according to claim 4, characterised in that the white clay layer has a high emissivity of 0.96 at a heating temperature of 400° C. in a spectral range between 5 and 14 µm.

9. A facility for implementing a method for measuring by thermography a heating surface intended to warm up silicon wafers for checking thermal homogeneity of the heating surface according to claim 1, comprising:

a station for depositing a homogeneous layer with a constant thickness of the coating material onto the surface to improve the detectable emissivity of the surface and to promote uniformity of the emissivity of the surface, the coating material having said emissivity detectable at the determined temperature within a spectral range of the thermal measurement apparatus; and a station for remotely thermally measuring said surface coated and heated, using the thermal measurement apparatus, said thermal measurement apparatus including a chassis having means for suspending the coated surface for positioning said surface in an upper part of the chassis; means for heating the surface; and means for supporting the thermal measurement apparatus; the suspension means being arranged so that the surface coated and heated is suspended with said surface directed towards a lower part of the chassis, that is towards the ground on which the chassis is erected; the support means being arranged so that the thermal measurement apparatus is directed towards the heated surface coated and suspended; and a station for removing the coating.

10. The facility according to claim 9, characterised in that the deposition station is a station for depositing by spraying the surface with a mixture of white clay and water, including either a manual deposition device, or an automatic deposition device.

11. The facility according to claim 10, characterised in that the deposition station also includes a drying apparatus.

12. The facility according to claim 10, characterised in that the measurement station also comprises a protective screen surrounding the measurement zone between the coated surface and the thermal measurement apparatus.

13. The method according to claim 6, wherein said manual deposition device is a manual paint gun, and said automatic deposition device is a robot with an XY movement and regulated pressure.

14. The facility according to claim 10, wherein said manual deposition device is a manual paint gun, and said automatic deposition device is a robot with an XY movement and regulated pressure.

* * * * *